US008996798B1

(12) United States Patent
Dropps et al.

(10) Patent No.: US 8,996,798 B1
(45) Date of Patent: Mar. 31, 2015

(54) SYSTEMS AND METHODS FOR USING TCAMS IN NETWORK DEVICES

(71) Applicant: QLOGIC, Corporation, Aliso Viejo, CA (US)

(72) Inventors: Frank R. Dropps, Maple Grove, MN (US); William J. Andersen, Mound, MN (US); Leo J. Slechta, Jr., Eagan, MN (US); Craig M. Verba, Maple Grove, MN (US)

(73) Assignee: QLOGIC, Corporation, Aliso Viejo, CA (US)

( * ) Notice: Subject to any disclaimer, the term of this patent is extended or adjusted under 35 U.S.C. 154(b) by 240 days.

(21) Appl. No.: 13/678,377

(22) Filed: Nov. 15, 2012

(51) Int. Cl.
*G06F 12/00* (2006.01)
*H04L 12/00* (2006.01)
*G06F 11/10* (2006.01)

(52) U.S. Cl.
CPC ................ *G06F 12/00* (2013.01); *H04L 12/00* (2013.01); *G06F 11/1064* (2013.01)
USPC ........................................................ 711/108

(58) Field of Classification Search
CPC ............ G06F 13/4022; G06F 17/0577; G06F 11/1064; H04L 12/00; H04L 12/56
See application file for complete search history.

(56) References Cited

U.S. PATENT DOCUMENTS

| 6,934,797 | B2 * | 8/2005 | Regev et al. ................... 711/108 |
| 2007/0258462 | A1 * | 11/2007 | Veits .......................... 370/395.31 |
| 2009/0154349 | A1 * | 6/2009 | Bernard ......................... 370/235 |
| 2009/0279558 | A1 * | 11/2009 | Davis et al. ................... 370/412 |

* cited by examiner

*Primary Examiner* — Hiep Nguyen
(74) *Attorney, Agent, or Firm* — Klein, O'Neill & Singh, LLp

(57) ABSTRACT

Methods and systems for a network device having a plurality of base-ports, each base-port having a plurality of sub-ports configured to operate independently as a port for sending and receiving information using one of a plurality of network links at a plurality of rates complying with a plurality of protocols. The network device includes a ternary content addressable memory (TCAM) module for storing a plurality of entries for routing frames that are received for the plurality of sub-ports complying with the plurality of protocols. Each TCAM entry has an associated history value that is used by a processor for the network device to purge TCAM entries based on an age of the TCAM entries.

20 Claims, 12 Drawing Sheets

TCAM History Module

| TCAM Entry 232L | TCAM History Bit 232K |
|---|---|
| D | Age bit for TCAM entry 0 |
| ⋮ | |
| N | Age bit for TCAM entry N |

| Ethernet Header 502 | FCOE Header 504 | SOF 506 | FC Header 508 | Pay Load 510 | FC CRC 512 | EOF 514 | Ethernet FCS 516 |

500

| Word/Bits | FC Header 508 ||||||
|---|---|---|---|---|---|---|
| | 31 | 24 23 | 16 15 | 08 07 | 00 ||
| | R_CTL 508C | | D_ID | | 508A ||
| | CS_CTL/Priority | | S_ID | | 508B ||
| | Type | | F_CTL |||| 
| | SEQ_ID | DF_CTL | | SEQ_CNT |||
| | OX_ID || | RX_ID |||
| | Parameter ||||||

SYSTEMS AND METHODS FOR USING TCAMS IN NETWORK DEVICES

BACKGROUND

1. Technical Field

The embodiments disclosed herein are related to networks and network devices.

2. Related Art

Networking systems are commonly used to move network information (which may also be referred to interchangeably, as frames, packets or commands) between computing systems (for example, servers) or between computing systems and network devices (for example, storage systems). Various hardware and software components are used to implement network communication.

The network switch is typically a multi-port device where each port manages a point-to-point connection between itself and an attached system. Each port can be attached to a server, peripheral, input/output subsystem, bridge, hub, router, or another switch, where each of the aforementioned network devices also has one or more ports. The term network switch as used herein includes a Multi-Level switch that uses plural switching elements within a single switch chassis to route data packets. Different network and storage protocols may be used to handle network information and storage information. Continuous efforts are being made to enhance the use of networking and storage protocols.

SUMMARY

The present embodiments have several features, no single one of which is solely responsible for their desirable attributes. Without limiting the scope of the present embodiments as expressed by the claims that follow, their more prominent features now will be discussed briefly. After considering this discussion, and particularly after reading the section entitled "Detailed Description," one will understand how the features of the present embodiments provide the advantages described herein.

In one embodiment, a network device having a plurality of base-ports, each base-port having a plurality of sub-ports configured to operate independently as a port for sending and receiving information using one of a plurality of network links at a plurality of rates complying with a plurality of protocols is provided. The network device includes a ternary content addressable memory (TCAM) module for storing a plurality of entries for routing frames that are received for the plurality of sub-ports complying with the plurality of protocols. Each TCAM entry has an associated history value that is used by a processor for the network device to purge TCAM entries based on an age of the TCAM entries.

In another embodiment, a network device having a plurality of base-ports, each base-port having a plurality of sub-ports configured to operate independently as a port for sending and receiving information using one of a plurality of network links at a plurality of rates complying with a plurality of protocols is provided. The network device also includes a scheduler that is configured to receive requests on behalf of the plurality of sub-ports for moving frames from a receive segment and for transmitting frames from a transmit segment of one of the base-ports. The requests from the plurality of sub-ports are generated by a request module after a destination for received frames is determined by a routing module that maintains a TCAM module, the TCAM module configured for storing a plurality of entries for routing frames that are received for the plurality of sub-ports complying with the plurality of protocols. Each TCAM entry has an associated history value that is used by a processor for the network device to purge TCAM entries based on an age of the TCAM entries.

In yet another embodiment, a machine-implemented method for managing a ternary content addressable module (TCAM) for routing frames by a network device is provided. The method includes maintaining a plurality of entries at the TCAM for routing frames for a base-port of the network device having a plurality of sub-ports configured to operate independently as a port for sending and receiving information using one of a plurality of network links at a plurality of rates complying with a plurality of protocols; using an age bit value for indicating an age for each TCAM entry; and purging TCAM entries based on age bits to accommodate new TCAM entries.

This brief summary has been provided so that the nature of the invention may be understood quickly. A more complete understanding of the invention can be obtained by reference to the following detailed description of the preferred embodiments thereof concerning the attached drawings.

BRIEF DESCRIPTION OF THE DRAWINGS

The various present embodiments now will be discussed in detail with an emphasis on highlighting the advantageous features. These embodiments depict the novel and non-obvious systems and methods for packet grouping in networks shown in the accompanying drawings, which are for illustrative purposes only. These drawings include the following figures, in which like numerals indicate like parts:

FIG. 1 is a functional block diagram of a network that the present embodiments may be used in connection with;

FIG. 2D illustrates an example of a TCAM history module entry, according to one embodiment;

DETAILED DESCRIPTION

Figure 1:
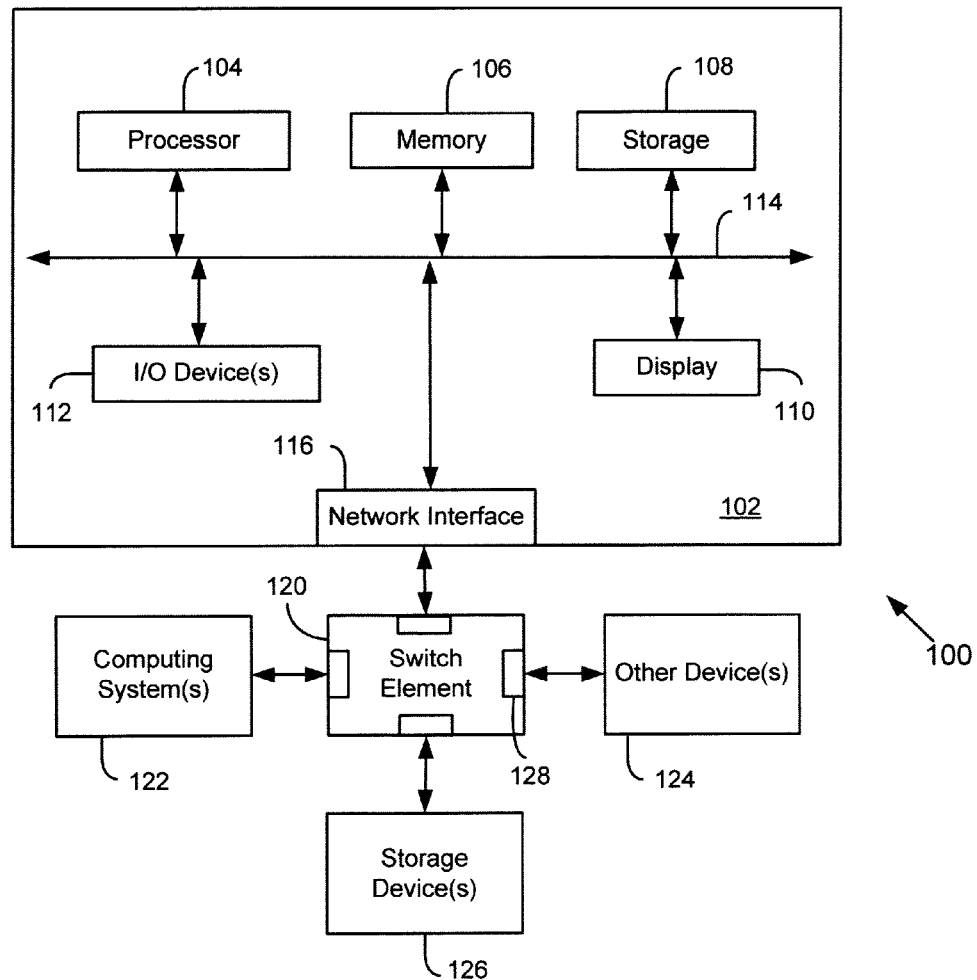

The following detailed description describes the present embodiments with reference to the drawings. In the drawings, reference numbers label elements of the present embodiments. These reference numbers are reproduced below in connection with the discussion of the corresponding drawing features.

As a preliminary note, any of the embodiments described with reference to the figures may be implemented using software, firmware, hardware (e.g., fixed logic circuitry), manual processing, or a combination of these implementations. The terms "logic," "module," "component," "system" and "functionality," as used herein, generally represent software, firmware, hardware, or a combination of these elements. For instance, in the case of a software implementation, the terms "logic," "module," "component," "system," and "functionality" represent program code that performs specified tasks when executed on a processing device or devices (e.g., CPU or CPUs). The program code can be stored in one or more computer readable memory devices.

More generally, the illustrated separation of logic, modules, components, systems, and functionality into distinct units may reflect an actual physical grouping and allocation of software, firmware, and/or hardware, or can correspond to a conceptual allocation of different tasks performed by a single software program, firmware program, and/or hardware unit. The illustrated logic, modules, components, systems, and functionality may be located at a single site (e.g., as implemented by a processing device), or may be distributed over a plurality of locations.

The term "machine-readable media" and the like refers to any kind of non-transitory medium for retaining information in any form, including various kinds of storage devices (magnetic, optical, static, etc.). Machine-readable media also encompasses transitory forms for representing information, including various hardwired and/or wireless links for transmitting the information from one point to another.

The embodiments disclosed herein, may be implemented as a computer process (method), a computing system, or as an article of manufacture, such as a computer program product or non-transitory, computer-readable media. The computer program product may be computer storage media, readable by a computer device, and encoding a computer program of instructions for executing a computer process.

Various network standards and protocols may be used to enable network communications, including Fibre Channel (FC), Fibre Channel over Ethernet (FCoE), Ethernet, and others. Below is a brief introduction to some of these standards. The present embodiments are described herein with reference to the Fibre Channel and Ethernet protocols. However, these protocols are used merely for ease of reference and to provide examples. The present embodiments are not limited to Fibre Channel and Ethernet.

Fibre Channel (FC) is a set of American National Standards Institute (ANSI) standards. Fibre Channel provides a serial transmission protocol for storage and network protocols such as HIPPI, SCSI, IP, ATM and others. Fibre Channel provides an input/output interface to meet the requirements of both Channel and network users. The Fibre Channel standards are incorporated herein by reference in their entirety.

Fibre Channel supports three different topologies: point-to-point, arbitrated loop and Fibre Channel Fabric. The point-to-point topology attaches two devices directly. The arbitrated loop topology attaches devices in a loop. The Fabric topology attaches computing systems directly to a Fabric, which are then connected to multiple devices. The Fibre Channel Fabric topology allows several media types to be interconnected.

A Fibre Channel switch is a multi-port device where each port manages a point-to-point connection between itself and its attached system. Each port can be attached to a server, peripheral, I/O subsystem, bridge, hub, router, or even another switch. A switch receives messages from one port and routes them to other ports. Fibre Channel switches use memory buffers to hold frames received and sent across a network. Associated with these buffers are credits, which are the number of frames that a buffer can hold per Fabric port.

Ethernet is a family of computer networking technologies for local area networks (LANs). Systems communicating over Ethernet divide a stream of data into individual packets called frames. Each frame contains source and destination addresses and error-checking data so that damaged data can be detected and re-transmitted. Ethernet is standardized in IEEE 802.3, which is incorporated herein by reference in its entirety.

Fibre Channel over Ethernet (FCoE) is a converged network and storage protocol for handling both network and storage traffic. The FCoE standard enables network adapters and network switches to handle both network and storage traffic using network and storage protocols. Under FCoE, Fibre Channel frames are encapsulated in Ethernet frames. Encapsulation allows Fibre Channel to use 1 Gigabit Ethernet networks (or higher speeds) while preserving the Fibre Channel protocol.

The systems and processes described below are applicable and useful in the upcoming cloud computing environment. Cloud computing pertains to computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. The term "cloud" is intended to refer to the Internet and cloud computing allows shared resources, for example, software and information, to be available, on-demand, like a public utility.

Typical cloud computing providers deliver common business applications online, which are accessed from another web service or software like a web browser, while the software and data are stored remotely on servers. The cloud computing architecture uses a layered approach for providing application services. A first layer is an application layer that is executed at client computers. In this example, the application allows a client to access storage via a cloud. After the application layer is a cloud platform and cloud infrastructure, followed by a "server" layer that includes hardware and computer software designed for cloud-specific services.

FIG. 1 shows an example of a system 100 that may be used in connection with the present embodiments. System 100 may include a computing system 102, which may be referred to as a host system. A typical host system 102 includes several functional components, including a central processing unit (CPU) (also referred to as a processor, processors or processing module) 104, a host memory (or main/system memory) 106, a storage device 108, a display 110, input/output ("I/O") device(s) 112, and other components (or devices). The host memory 106 is coupled to the processor 104 via a system bus or a local memory bus 114.

The processor 104 may be, or may include, one or more programmable general-purpose or special-purpose microprocessors, digital signal processors (DSPs), programmable controllers, application specific integrated circuits (ASICs), programmable logic devices (PLDs), or the like, or a combination of such hardware-based devices.

The host memory 106 provides the processor 104 access to data and program information that is stored in the host memory 106 at execution time. Typically, the host memory 106 includes random access memory (RAM) circuits, read-only memory (ROM), flash memory, or the like, or a combination of such devices.

The storage device 108 may comprise one or more internal and/or external mass storage devices, which may be or may include any conventional medium for storing large volumes of data in a non-volatile manner. For example, the storage device 108 may include conventional magnetic disks, optical disks such as CD-ROM or DVD-based storage, magneto-optical (MO) storage, flash-based storage devices, or any other type of non-volatile storage devices suitable for storing structured or unstructured data.

The host system 102 may also include a display device 110 capable of displaying output, such as an LCD or LED screen and others, and one or more input/output (I/O) devices 112, for example, a keyboard, mouse, etc. The host system 102 may also include other devices/interfaces for performing various functions, details of which are not germane to the inventive embodiments described herein.

The host system 102 also includes a network interface 116 for communicating with other computing systems 122, storage devices 126, and other devices 124 via a switch element 120 and various links. The network interface 116 may comprise a network interface card (NIC) or any other device for facilitating communication between the host system 102, other computing systems 122, storage devices 126, and other devices 124. The network interface 116 may include a converged network adapter, such as that provided by QLogic Corporation for processing information complying with storage and network protocols, for example, Fibre Channel and Ethernet. As an example, the network interface 116 may be a FCoE adapter. In another embodiment, the network interface 116 may be a host bus adapter, for example, a Fibre Channel host bus adapter, such as that provided by QLogic Corporation. Details regarding the network interface 116 are not provided since they are not germane to the inventive embodiments described herein.

In one embodiment, the processor 104 of the host system 102 may execute various applications, for example, an e-mail server application, databases, and other application types. Data for various applications may be shared between the computing systems 122 and stored at the storage devices 126. Information may be sent via switch 120 ports. The term port as used herein includes logic and circuitry for receiving, processing, and transmitting information.

Each device (e.g. the host system 102, the computing systems 122, the storage devices 126, and the other devices 124) may include one or more ports for receiving and transmitting information, for example, node ports (N_Ports), Fabric ports (F_Ports), and expansion ports (E_Ports). Node ports may be located in a node device, e.g. network interface 116 of the host system 102 and an interface (not shown) for the storage devices 126. Fabric ports are typically located in Fabric devices, such as the switch element 120. Details regarding the switch 120 are provided below.

Figure 2A:
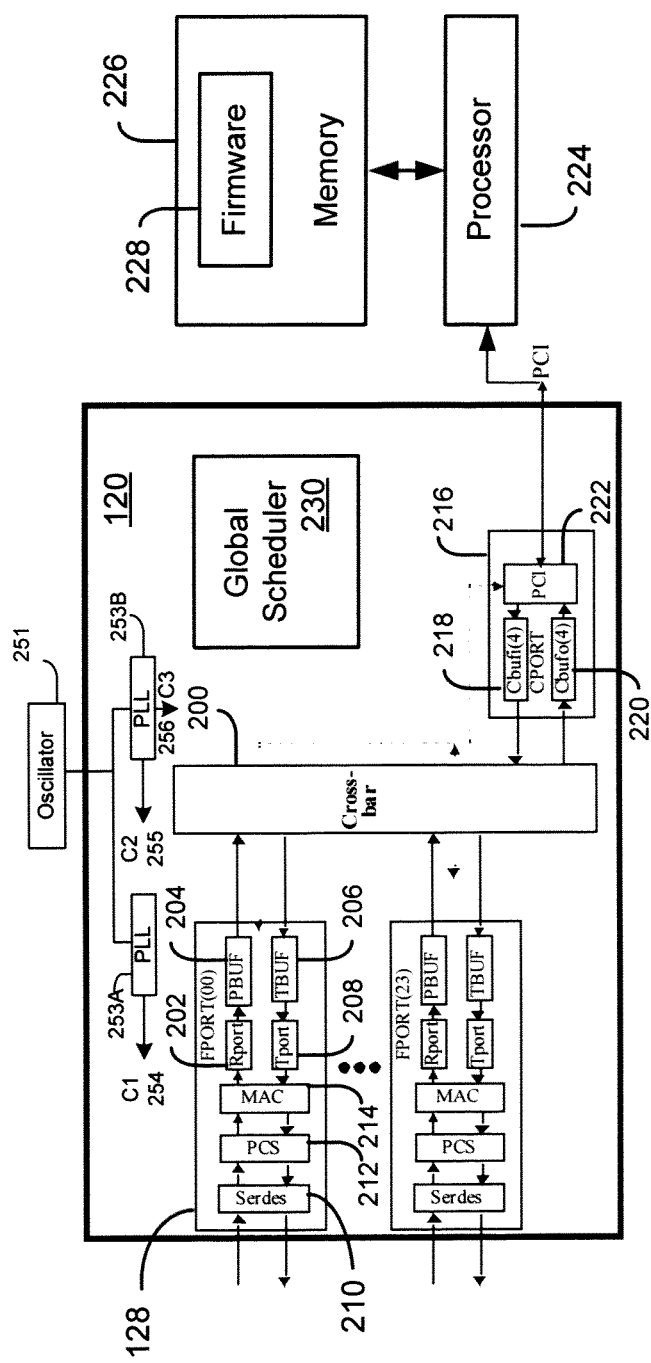
FIG. 2A is a functional block diagram of a switch element according to the present embodiments.

FIG. 2A is a high-level block diagram of switch element 120, also referred to as the switch 120. Switch element 120 may be implemented as an application specific integrated circuit (ASIC) having a plurality of ports 128. An external oscillator 251 may be used to power a plurality of phase locked loop (PLL) circuits 253A-253B to generate a plurality of clocks, C1 254, C2 255 and C3 256. As an example, C1 254 may be 425 MHz when a port is configured to operate as a Fibre Channel port, C2 255 may be 312 Mhz when a port is configured to operate as an Ethernet port, and C3 256 may be a system clock of 825 MHz. The embodiments disclosed herein are not limited to any particular clock rate.

Ports 128 are generic (GL) ports and may include an N_Port, F_Port, FL_Port, E_Port, or any other port type. Ports 128 may be configured to operate as Fibre Channel, FCoE or Ethernet ports. In other words, depending upon what it is attached to, each GL port can function as any type of port. As an example, ports 128 of FIG. 2A are drawn on the same side of the switch element 120. However, the ports 128 may be located on any or all sides of switch element 120. This does not imply any difference in port or ASIC design. The actual physical layout of the ports will depend on the physical layout of the ASIC.

Ports 128 communicate via a time shared crossbar 200, which includes a plurality of switch crossbars for handling specific types of data and data flow control information. For illustration purposes only, the switch crossbar 200 is shown as a single crossbar. The switch crossbar 200 may be a connectionless crossbar (packet switch) of conventional design, sized to connect a plurality of paths. This is to accommodate the ports 128 plus a port 216 for connection to a processor 224 that may be external to the switch element 120. In another embodiment, the processor 224 may be located within a switch chassis that houses the switch element 120.

Each port 128 receives incoming frames (or information) and processes the frames according to various protocol requirements. The port 128 includes a shared, time multiplexed pipeline for receiving frames (or information). The pipeline includes a serializer/deserializer (SERDES) 210, a physical coding sub-layer (PCS) 212, and a time multiplexed media access control (MAC) sub-layer 214. The SERDES 210 receives incoming serial data and converts it to parallel data. The parallel data is then sent to the PCS 212 and the MAC 214 before being sent to a receive segment (or receive port (RPORT) 202.

The RPORT 202 temporarily stores received frames at a memory storage device, shown as PBUF (pause buffer) 204. The frames are then sent to a transmit segment (or transmit port (TPORT)) 208 via the crossbar 200. The TPORT 208 includes a memory device shown as a transmit buffer (TBUF) 206. The TBUF 206 may be used to stage frames or information related to frames before being transmitted. The TPORT also includes a shared MAC and PCS or shares the PCS and MAC of the RPORT 202. The SERDES at TPORT is used to convert parallel data into a serial stream.

The switch element 120 may also include a control port (CPORT) 216 that communicates with the processor 224. The CPORT 216 may be used for controlling and programming the switch element 120. In one embodiment, the CPORT 216 may include a PCI (Peripheral Component Interconnect) 222 interface to enable the switch element 120 to communicate with the processor 224 and a memory 226. The processor 224 controls overall switch element operations, and the memory 226 may be used to store firmware instructions 228 for controlling switch element 120 operations.

The CPORT 216 includes an input buffer (CBUFI) 218, which is used to transmit frames from the processor 224 to the ports 128. The CPORT 216 further includes an output buffer (CBUFO) 220, which is used to send frames from the PBUFs 204, the TBUFs 206, and CBUFI 218 that are destined to processor 224.

Port 128 described above may be referred to as a "base-port" that may have more than one network link available for receiving and transmitting information. Each network link allows the base-port to be configured into a plurality of independently, operating sub-ports, each uniquely identified for receiving and sending frames. The configuration may vary based on protocol and transfer rates. For example, port 128 may be configured to operate as four single lane Ethernet ports, three single lane Ethernet ports and one single lane Fibre Channel port, two single lane Ethernet ports and two single lane Fibre Channel ports, one single lane Ethernet port and three single lane Fibre Channel port, four single lane Fibre Channel port, two double lane Ethernet ports, 1 double lane Ethernet port and two single lane Ethernet ports, one double lane Ethernet port, one single lane Ethernet port and one single lane Fibre Channel port, one double lane Ethernet port and two single lane Fibre Channel port, one four lane Ethernet port or one four lane Fibre Channel port. Port 128 uses some logic that is shared among the multiple sub-ports and some logic that is dedicated to each sub-port.

Figure 2B:
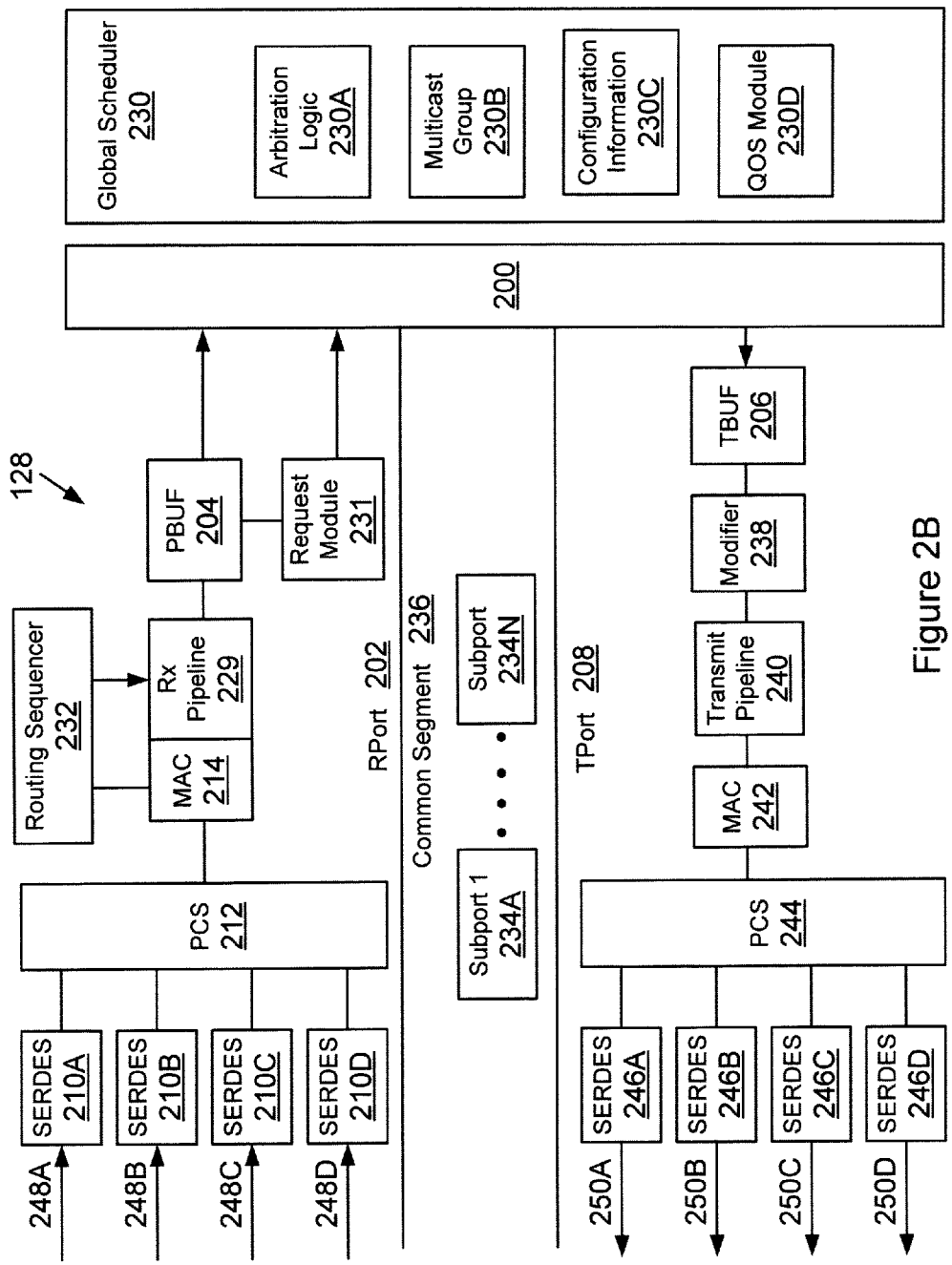
FIG. 2B is a functional block diagram of a base-port, according to one embodiment.

FIG. 2B shows an example of base-port 128 having RPORT 202, TPORT 208 and a common segment 236, according to one embodiment. RPORT 202 is used for receiving and processing frames, while TPORT 208 is used for transmitting frames. Common segment 236 is used to store information that may be commonly used among different components of base-port 128. In one embodiment, base-port may be configured to include a plurality of sub-ports. The configuration information/logic 234A-234N for each sub-port may be stored in common segment 236.

RPORT 202 may include or have access to a plurality of network links (or lanes), for example, four independent physical network links 248A-248D, each configured to operate as a portion of an independent sub-port within base-port 128. Each network link is coupled to a SERDES 210-210D that share PCS 212 and MAC 214. The multiple lanes also share a receive pipeline 229 that is used for pre-processing received frames before they are transferred. Both MAC 214 and receive pipelines 229 are time multiplexed so that they can be shared among the plurality of links based on how the ports are configured to operate. PCS 212 and MAC 214 may be a part of the receive pipeline 229.

Incoming frames are received via one of the network links 248A-248N. The received frame is processed by the appropriate SERDES and then sent to the PCS 212. After PCS 212 processes the frame, the frame is provided to MAC 214 a structure time-shared among a plurality of sub-ports. This means that for a certain time segment (for example, clock cycles), MAC 214 may be used by one of the sub-ports. After the MAC 214 processes the frame it is sent to receive pipeline 229 that is also time shared. Information regarding the frame or a copy of the frame is also provided to a routing sequencer (or module) 232 that determines the destination of the received packets. In one embodiment, a frame whose destination is processor 224 is given the highest priority, followed by a frame that is routed by a TCAM (ternary content addressable memory) or steering registers located within a routing sequencer 232. More than one routing sequencer 232 may be used for each base-port 128.

Frames that are ready to be sent out are then staged at PBUF 204. PBUF 204 may have a plurality of queues that may be referred to as receive queues. The receive queues temporarily store frames, until a request to move the frame is granted.

To move frames from the receive queues; a request module 231 generates requests for a global scheduler 230, also referred to as scheduler 230. Request module 231 maintains a data structure (not shown) that tracks a number of requests that may be pending for each sub-port. Request module 231 also removes requests from the data structure when a grant is received for a particular request.

Scheduler 230 stores configuration information 230C for various ports and some of that information may be used to select requests. Scheduler 230 includes arbitration logic 230A that performs dual stage arbitration for processing requests from various base-ports, as described below in detail. Scheduler 230 also maintains a data structure at a memory labeled as multicast group 230B. The data structure stores information for identifying multicast groups that may receive multicast frames, i.e. frames that are destined to multiple destinations. Scheduler 230 uses the information for processing requests that involve multicast frames. Scheduler 230 further includes a quality of service (QOS) module 230D that monitors QOS data.

Frames for transmission via TPORT 208 move via TBUF 206 and a modifier 238. In one embodiment, modifier 238 may be used to insert, change or remove information from an outgoing frame. The modification is based on the frame type and transmit virtual queue. The time shared transmit pipeline 240 and MAC 242 are used to process outgoing frames. PCS 244, SERDES 246A-246D are used similar to PCS 212 and SERDES 210A-210D. PCS 244 and MAC 242 may be a part of transmit pipeline 240.

Network links 250A-250D are similar to links 248A-248D, except links 250A-250D are used to transmit frames. Furthermore, links 248A-248D and 250A-250D may be a part of the same physical links that can receive and transmit data. In one embodiment, there are multiple requests and grants processed simultaneously.

Figure 2C:
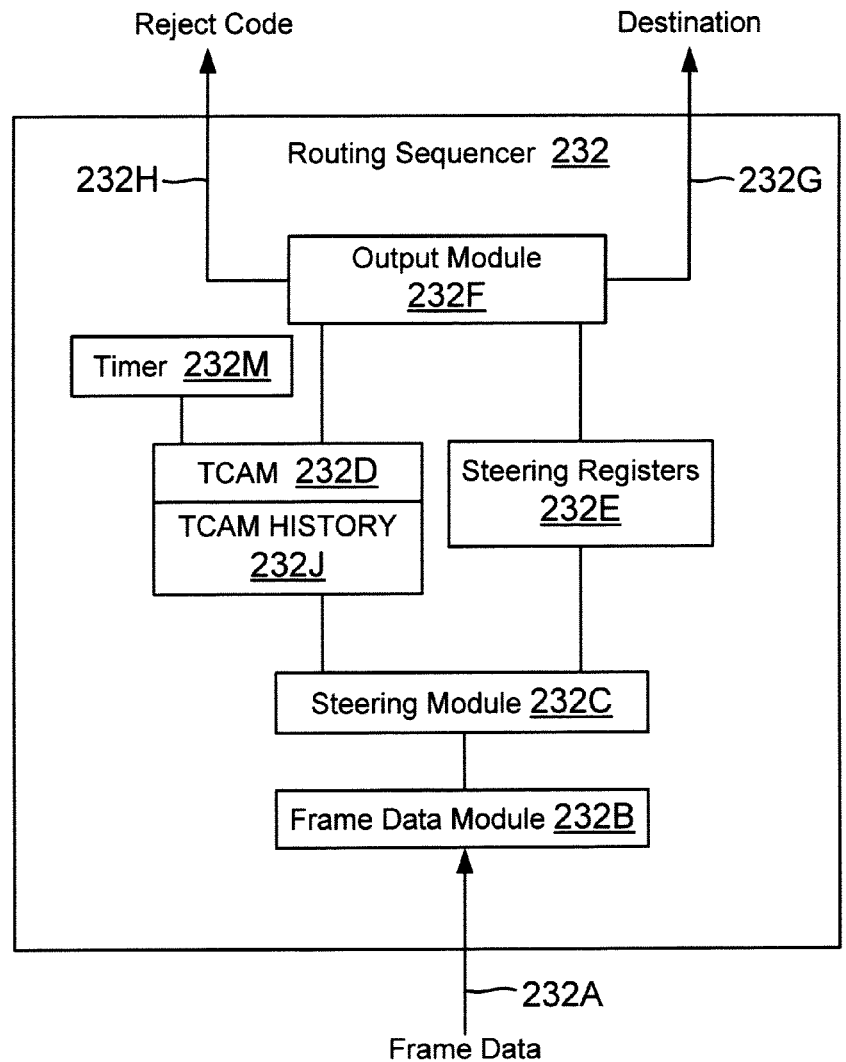
FIG. 2C is a functional block diagram of routing module (or sequencer) 232, according to one embodiment.

FIG. 2C shows a block diagram of routing sequencer 232, used according to one embodiment. The routing sequencer 232 receives frame data 232A that is staged at frame data module 232B. The frame data 232A may be obtained from MAC 214 after the frames have been pre-processed by PCS 212 and MAC 214.

The frame data 232A is then used by a steering module 232C to select a destination. The destination may be selected based on certain frame fields, for example, an identifier of a frame source and/or a destination identifier. The steering module 232C may select the destination using a TCAM 232D or steering register 232E or a combination of the two.

The steering registers 232E are used if there is no TCAM match and the frame type is FC or FCoE. If a match is found, then a destination 232G is provided by an output module 232F to request module 231. If there is no match and the frame type is not FC or FCoE, then the output module 232F generates a reject code 232H.

Unlike standard computer memory (random access memory (RAM)) in which a user supplies a memory address and the RAM returns the data word stored at that address, TCAM 232D is designed such that when a data word is supplied by steering module 232C, TCAM 232D searches its entire memory to see if that data word is stored anywhere in it. If the data word is found, TCAM 232D returns a list of one or more storage addresses where the word was found.

TCAM 232D also maintains a TCAM history module 232J to determine what TCAM entries have been matched so that old entries can be removed. TCAM history module 232J may be used to track information that may be included in received packets, for example, source MAC address, virtual local area network (VLAN) identifier information or other packet fields as described below in detail.

The TCAM history module 232J allows one to purge old entries so that the TCAM can be used efficiently. Routing sequencer 232 may also include a timer module 232M that may be used to purge TCAM history, as described below in detail. In one embodiment, firmware is used to periodically purge the TCAM history stored in the TCAM history module 232J.

FIG. 2D shows an example of TCAM history module 232J that may be used to estimate the age of a TCAM entry, as described below in detail. In one embodiment, TCAM history module 232J may include 512 bits, organized as 16-32 bit words. Each bit is associated with a corresponding entry 232L in TCAM 232. Each bit of a TCAM search uses two bits in a TCAM entry. The two bits perform the match functions as defined in Table 1 below.

TABLE 1

TCAM Y and X Truth

| X(i) | Y(i) | TCAM Search Result on Bit(i) |
|---|---|---|
| 0 | 0 | WildCard - Forces match on Bit(i) regardless of SReg(i) value |
| 0 | 1 | Match if SReg(i) = 1 (SReg is the steering register) |
| 1 | 0 | Match if SReg(i) = 0 |
| 1 | 1 | No match on Bit(i) regardless of SReg(i) value |

In the illustrated embodiment, a TCAM search word is 128 bits wide. A packet header is parsed to form the TCAM search word. For Fibre Channel packets the TCAM search word includes R Control (R_CTL) field, D_ID (destination identifier) field, S_ID (source identifier) field, SOF (start of frame) code, Type field, and payload data. For FCoE packets the search word includes an Ether Type field, VLAND_ID field, R Control field, D_ID field, S_ID field, SOF code, Type field, and payload data. For non-FCoE Ethernet packets the search word may be composed of the Ether Type field, VLAND_ID field, Destination MAC address, and the Source MAC address.

The aging bit 232K is associated with each TCAM entry. Processor 224 can read the contents of TCAM history module 232J and reset the age bits 232K.

Whenever there is a TCAM match during a frame steering operation, the associated bit for that entry may be set to a certain value, for example, 1. This value may indicate that the TCAM entry has had a search match since the age bit was set to 0. A value of 0 may indicate that a TCAM entry has not had a search match since it was set to 0. Processor 224 evaluates the age bits to estimate the age of an entry. The age is used to determine which entry from the TCAM should be purged after a given interval.

Figure 3:
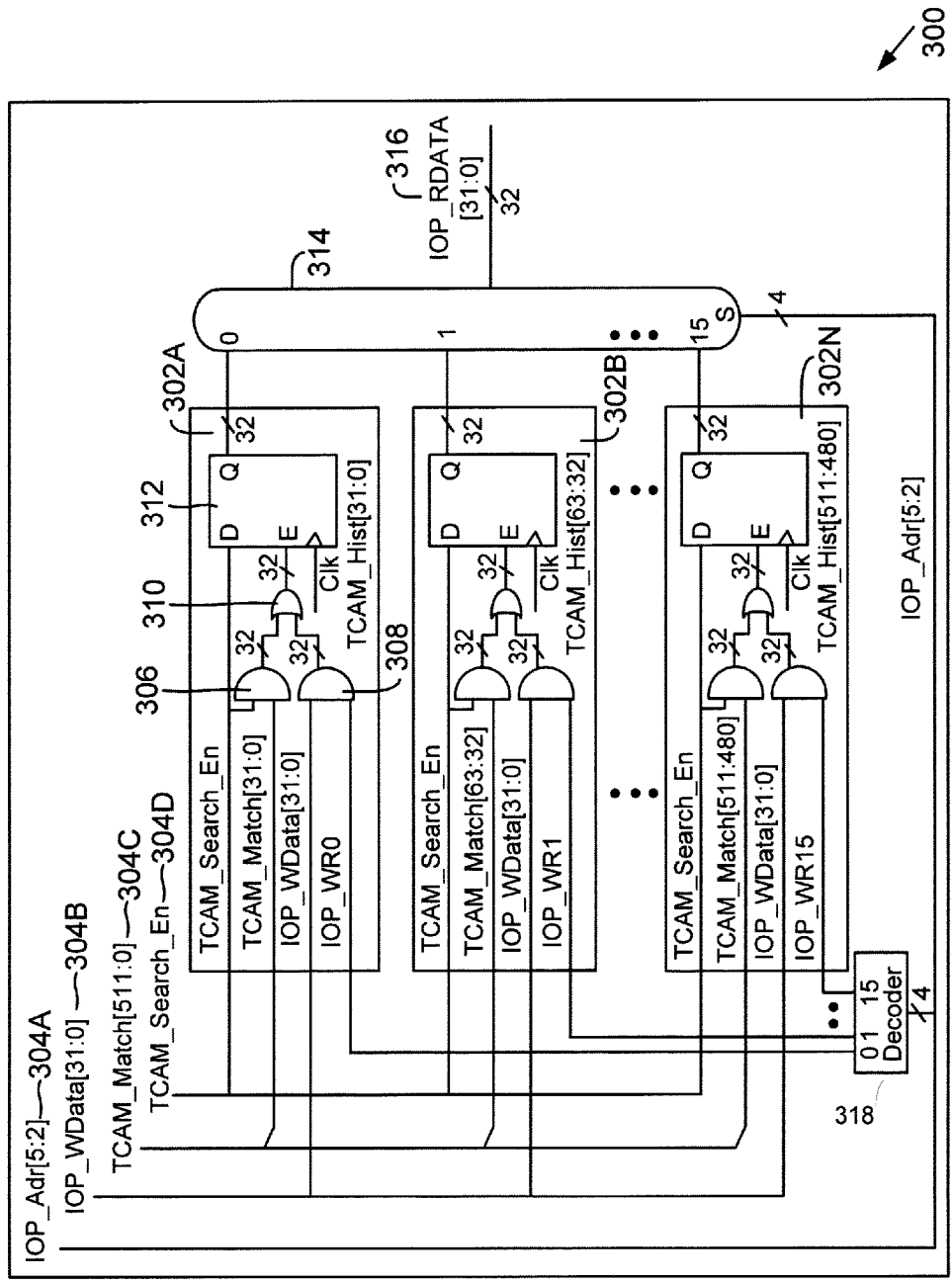
FIG. 3 illustrates an example of a history module, according to one embodiment.

FIG. 3 shows logic for implementing the TCAM history module 232J, according to one embodiment. As mentioned above, the TCAM history module 232J provides a history bit for each of the TCAM entries. The illustrated embodiment of FIG. 3 shows 512 TCAM entries identified. The 512 TCAM history bits are grouped into 6 sets of 32 bits to facilitate reading with a 32 bit data word microprocessor. The first group of 32 TCAM history bits is shown within logic 302A and the last group as 302N.

Logic 302A receives various signals 304A-304D. Signal 304A is an address signal used by IOP 224 to read a TCAM history bit. IOP_W Data signal 304B may be used by IOP 224 to clear a history bit. TCAM_Match 304C signal indicates that there has been a TCAM match for a received packet. TCAM_Search_En 304D signal may be used to enable TCAM searching.

A single bit slice is examined for clarity because the operation of each of the 512 bits is identical. Logic 302A includes a storage register 312 that may be composed of a Flip/Flop or a latch. Register 312 is used to hold the state of a TCAM History bit that can be read by IOP 224 using signal 304A, multiplexer 314, and examining signal IOP_RData 316. The storage register 312 can also be cleared by processor 224 using signals 304A and 304B, decoder 318, and gates 308 and/or 310. As an example, when IOP_W DATA 304B value is a 1, then the TCAM History register 312 will be cleared. The TCAM History register 312 is set to a 1 when the TCAM_Search_En 304D is active and the corresponding TCAM_Match signal 304C is also active.

Figure 4A:
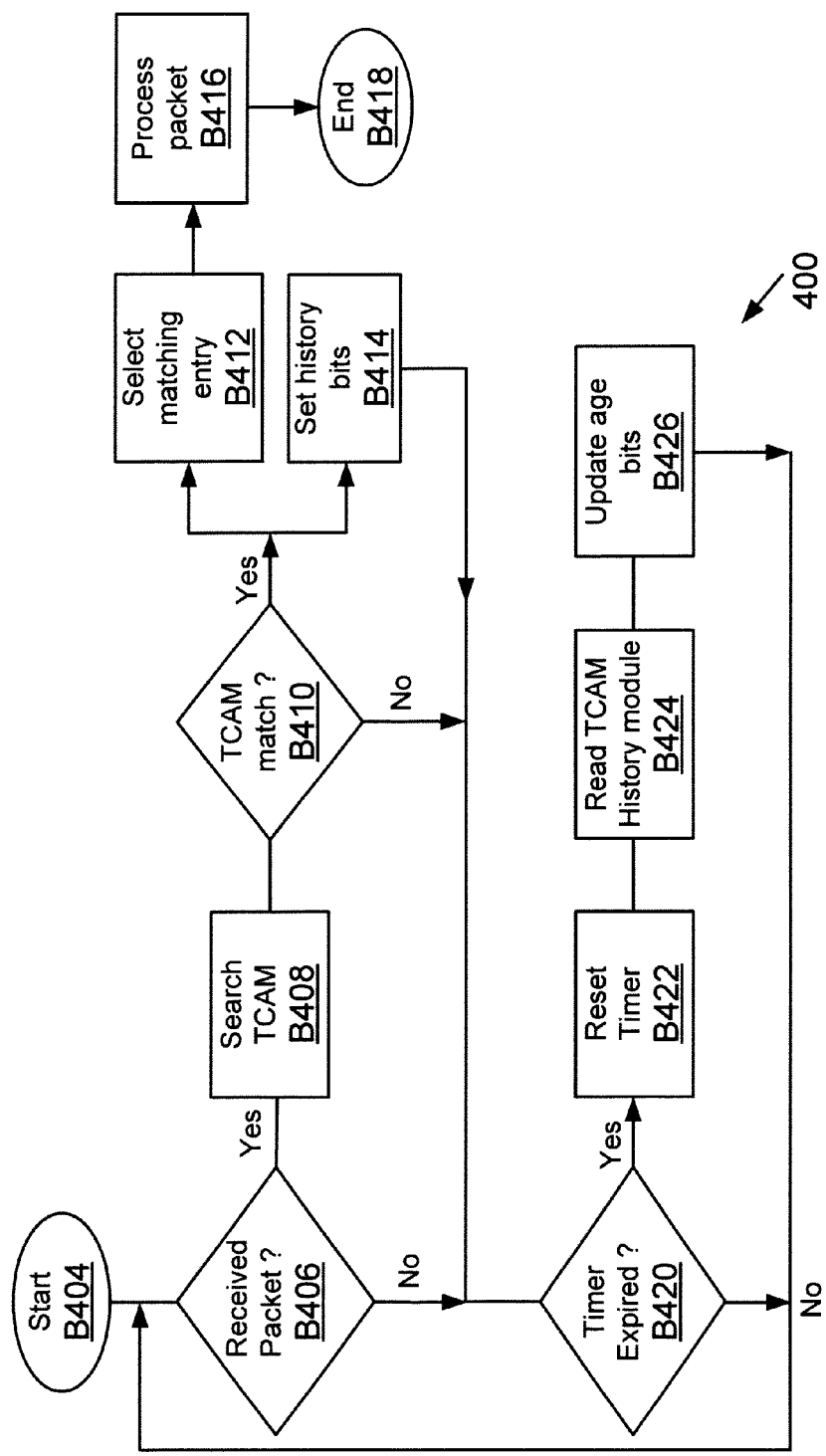
FIGS. 4A-4D illustrate process flow diagrams, according to one embodiment.

FIG. 4A shows a process 400 using TCAM 232D, according to one embodiment. The process begins in block B404. In block B406, the process determines if a packet has been received at RPORT 202. If no packet has been received, then the process moves to block B420, described below in detail. If a packet has been received, then after the packet has been processed by PCS 212 and MAC 214, the TCAM 232D is searched. The TCAM search may be performed using one or more fields, for example, Destination MAC Address field, Source MAC Address field or any of the other packet header fields. If there is no TCAM match, then the process moves to block B420, described below.

If there is a TCAM match in block B410, then a matching TCAM entry is selected in block B412. In one embodiment, if more than one entry of the TCAM matches the search data the lowest number entry is selected in block B412. The packet is then processed in block B416 and the packet processing aspect of the process ends in block B418.

When any entry from the TCAM receives a match during a search operation, the history bits 232K associated with matching entries are set in block B414. The packet is then processed in block B416 and the process ends in block B418. As described above, the history bit allows processor 224 to estimate the age of TCAM entries such that old TCAM entries are purged to make room for new TCAM entries.

In block B420, the process determines if timer 232M has expired. If the timer has not expired, the process moves back to block B406. If the timer has expired, then it is reset in block B422. The TCAM history module 232J is read by processor 224 in block B424. The age bits are then updated in block B426.

Figure 4B:
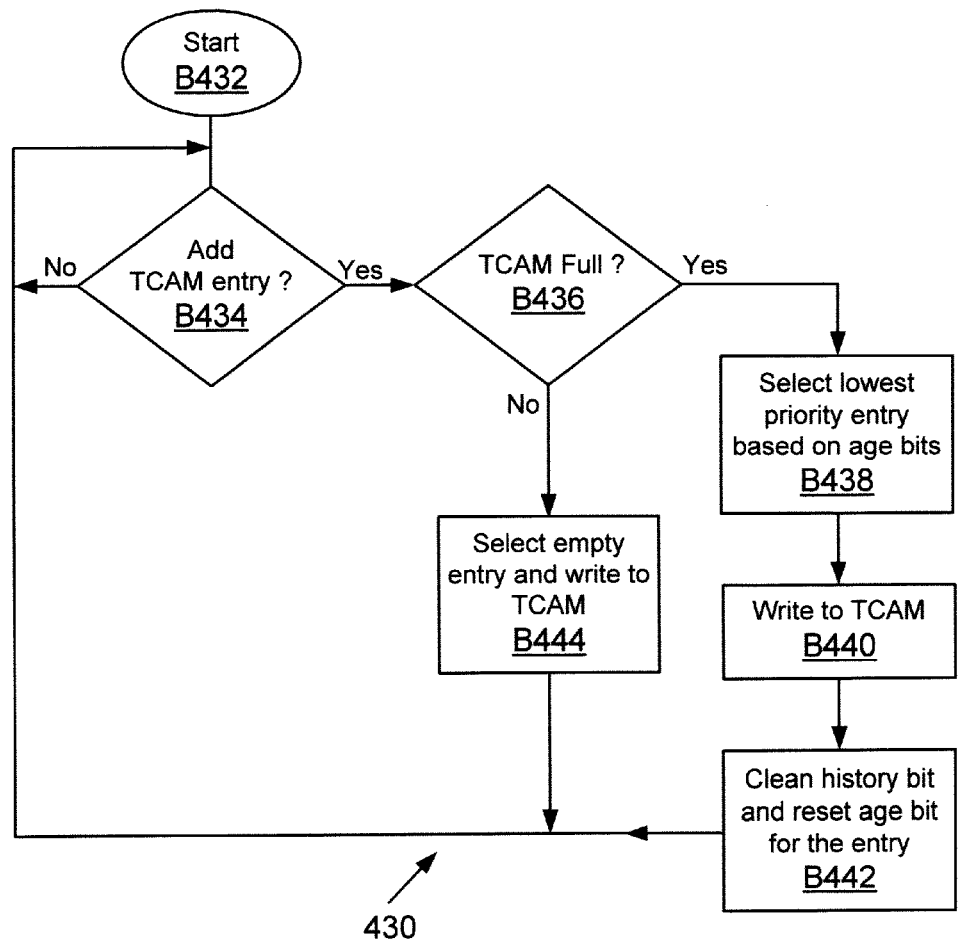

FIG. 4B shows a process 430 for adding an entry to TCAM 232D, according to another embodiment. The process begins in block B432. In block B434, the process determines if an entry needs to be added to TCAM 232D. If no entry needs to be added, the process simply loops back to block B434.

If an entry needs to be added, then in block B436, processor 224 determines if TCAM 232D is full. If the TCAM is not full, then an entry is added in block B444 and the process moves back to block B434.

If the TCAM is full, then in block B438, then a lowest priority entry is selected, based on the age bits 232K described above. The TCAM is then written in block B440. The history bit for that entry is cleared and the age bit is reset in block B442. The process then moves to block B406.

Figure 4C:
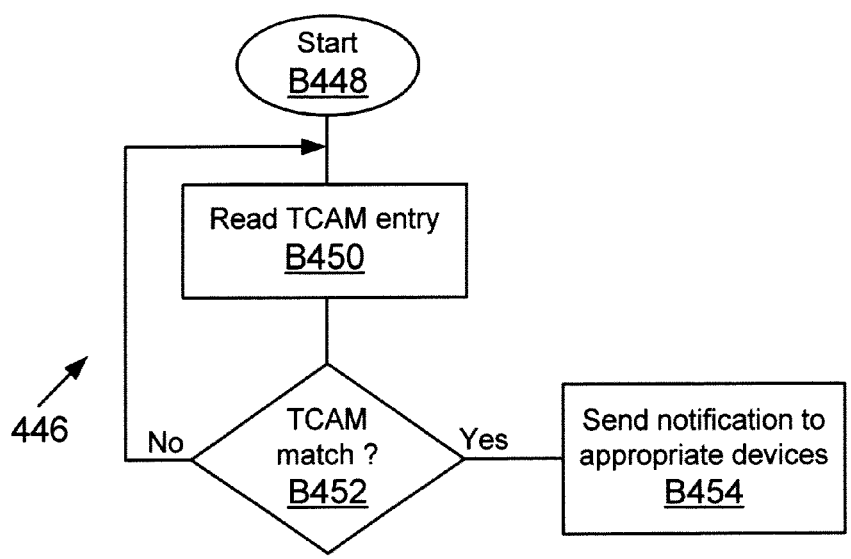

FIG. 4C shows a process 446, according to another embodiment. The process begins in block B448. In block B450, a TCAM search operation is performed. If there is no match, the process moves back to block 450. If there is a match, then a notification is sent in block B454 to the appropriate devices.

Figure 4D:
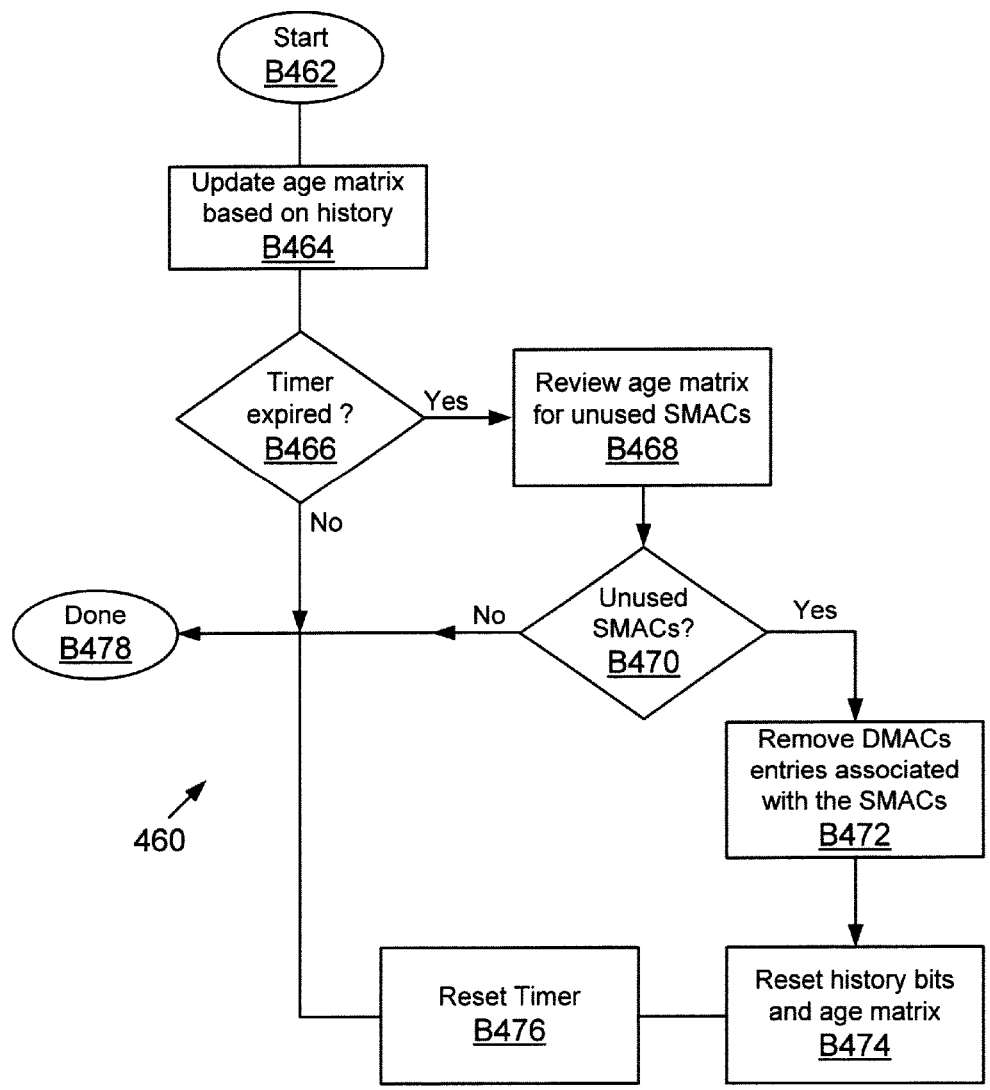

FIG. 4D shows a process 460 for managing source and destination MAC addresses (SMACs and DMACs), according to one embodiment. The process begins in block B462. In block B464, the age bits of TCAM history module are updated based on history. In block B466, the process determines if timer 232M has expired. If the timer expired, then in block B468, processor 224 reviews the age bits of the TCAM history module to determine if there are any unused SMACs. The process determines in block B470, if there are unused SMACs. If yes, then in block B472, the DMACs associated with the SMACs are removed from the TCAM. The age bits are then reset in block B474. If there are no unused SMACs, then the process ends in block B478. If the timer has not expired in block B466, then the timer is reset in block B476 and the process moves to block B474 that has been described above.

Figures 5A, 5B, 5C:
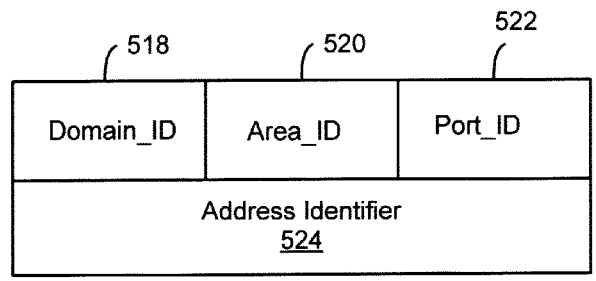
FIGS. 5A-5C illustrate examples of frame formats used by the current embodiments.

FIG. 5A shows an example of an FCoE packet format 500 for processing network and storage traffic, according to the present embodiments. The FCoE packet 500 includes an Ethernet header 502. In one embodiment, the Ethernet header 502, which includes the Ethernet type, may be fourteen bytes in length, for example. The Ethernet header may also include optional Tag fields (not shown). The FCoE packet 500 also includes an FCoE header 504 that includes a number of reserved fields. A start of frame (SOF) 506 indicates the beginning of the embedded Fibre Channel frame and may be one byte, for example.

The FCoE packet 500 may also include a Fibre Channel header (FC Header) 508 that may be 24 bytes long with a payload 510. The Fibre Channel cyclic redundancy code (CRC) 512 may be 4 bytes and the Fibre Channel end of frame (EOF) 514 may be 1 byte in size. The EOF 514 indicates the end of the embedded Fibre Channel frame. The Ethernet FCS 516 is inserted after the Fibre Channel EOF 514.

FIG. 5B shows a standard 24-bit Fibre Channel address identifier 524. The address identifier 524 includes a Domain_ID 518, an Area_ID 520, and a Port_ID 522. The Domain_ID 518 is a Domain identifier based on the upper 8-bits of the 24-bit Fibre Channel address. A Domain includes one or more Fibre Channel switches that has the same Domain_ID for all N_Ports and NL_Ports within or attached to the switches. If there is more than one switch in the Domain, then each switch within the Domain is directly connected via an Inter-Switch Link to at least one other switch in the same Domain.

The Area_ID 520 is an Area identifier based on the middle 8 bits of the 24-bit Fibre Channel address. The Area_ID 520 applies either to (a) one or more N_Ports within and attached to a Fibre Channel switch, or (b) to an Arbitrated Loop of NL_Ports attached to a single FL_Port.

The Port_ID 522 is the lower 8-bits of a Fibre Channel address. The Port_ID 522 applies to either (a) a single N_Port or virtualized N_Port within a Domain/Area, (b) the valid AL_PA of a single NL_Port or FL_Port on an Arbitrated Loop.

FIG. 5C shows an example of the FC header 508 of FIG. 3A. The following frame header fields that are used in the present methods are:

D_ID 508A—A 24-bit Fibre Channel frame header field that contains the destination address for a frame; and S_ID 508B—A 24-bit Fibre Channel frame header field that contains the source address for a frame.

R_CTL 508C—A routing control flag in a Fibre Channel header.

Figure 6:
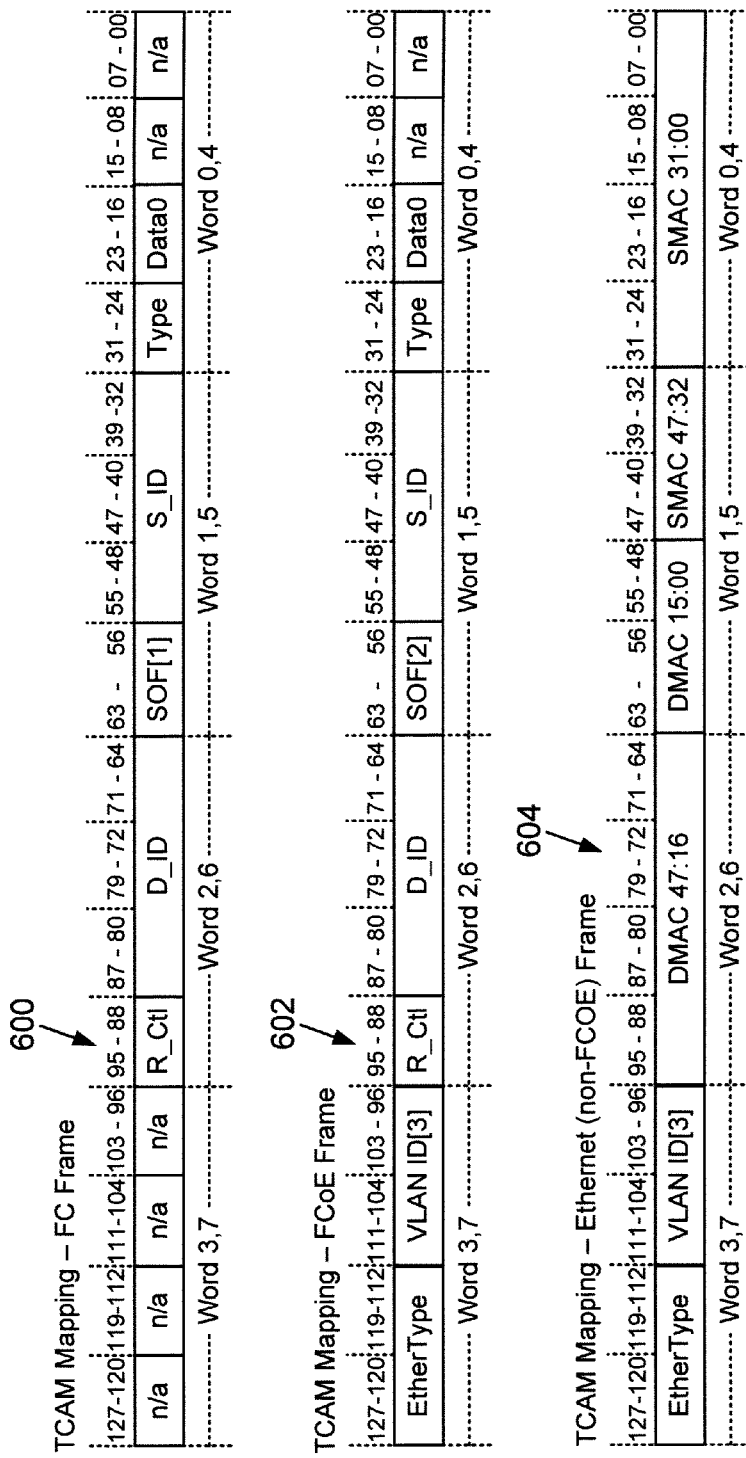
FIG. 6 illustrates an example of TCAM mapping for different frame formats, according to one embodiment.

FIG. 6 shows an example of TCAM mapping for different frame types. For example, 600 is TCAM mapping for Fibre Channel frames, 602 is for FCoE frames, and 604 is for Ethernet frames. The embodiments disclosed herein are not limited to any particular frame type.

The above description presents the best mode contemplated for carrying out the present invention, and of the manner and process of making and using it, in such full, clear, concise, and exact terms as to enable any person skilled in the art to which it pertains to make and use this invention. This invention is, however, susceptible to modifications and alternate constructions from that discussed above that are fully equivalent. For example, the foregoing embodiments may be implemented in adapters and other network devices. Consequently, this invention is not limited to the particular embodiments disclosed. On the contrary, this invention covers all modifications and alternate constructions coming within the spirit and scope of the invention as generally expressed by the following claims, which particularly point out and distinctly claim the subject matter of the invention.

What is claimed is:

1. A network device, comprising:
a plurality of base-ports, each base-port having a plurality of sub-ports configured to operate independently as a port for sending and receiving information using one of a plurality of network links at a plurality of rates complying with a plurality of protocols;
a routing sequencer comprising:
a ternary content addressable memory (TCAM) module for storing a plurality of entries for routing frames that are received for the plurality of sub-ports complying with the plurality of protocols, wherein each TCAM entry has an associated history bit value that is used by a processor for the network device to purge TCAM entries based on an age of the TCAM entries; and
a timer;
wherein, upon expiration of the timer, the routing sequencer resets the timer and updates the history bit values associated with the TCAM entries; and
wherein, when an incoming frame is matched to one of the plurality of entries for routing frames in the TCAM, the routing sequencer updates the history bit value associated with that one matched entry.

2. The network device of claim 1, wherein the network device is a switch coupled to one or more devices.

3. The network device of claim 1, wherein one of the plurality of sub-ports is configured to operate as a Fibre Channel port.

4. The network device of claim 1, wherein one of the plurality of sub-ports is configured to operate as an Ethernet port or a Fibre Channel over Ethernet port.

5. The network device of claim 1, further comprising a scheduler that is configured to receive requests on behalf of the plurality of sub-ports for moving frames from a receive segment and for transmitting frames from a transmit segment of one of the base-ports.

6. The network device of claim 5, wherein the requests from the plurality of sub-ports are generated by a request module after a destination for received frames is determined by the routing sequencer that maintains the TCAM module.

7. The network device of claim 6, wherein the routing sequencer is shared by the plurality of sub-ports.

8. The network device of claim 6, wherein the routing sequencer is dedicated to one of the plurality of sub-ports.

9. A network device, comprising:
a plurality of base-ports, each base-port having a plurality of sub-ports configured to operate independently as a port for sending and receiving information using one of a plurality of network links at a plurality of rates complying with a plurality of protocols; and
a scheduler that is configured to receive requests on behalf of the plurality of sub-ports for moving frames from a receive segment and for transmitting frames from a transmit segment of one of the base-ports;
wherein the requests from the plurality of sub-ports are generated by a request module after a destination for received frames is determined by a routing module that comprises:
a TCAM module, the TCAM module configured for storing a plurality of entries for routing frames that are received for the plurality of sub-ports complying with the plurality of protocols, wherein each TCAM entry has an associated history value that is used by a processor for the network device to purge TCAM entries based on an age of the TCAM entries; and a timer;
wherein, upon expiration of the timer, the routing module resets the timer and updates the history bit values associated with the TCAM entries; and
wherein, when an incoming frame is matched to one of the plurality of entries for routing frames in the TCAM, the routing module updates the history bit value associated with that one matched entry.

10. The network device of claim 9, wherein the network device is a switch coupled to one or more devices.

11. The network device of claim 9, wherein one of the plurality of sub-ports is configured to operate as a Fibre Channel port.

12. The network device of claim 9, wherein one of the plurality of sub-ports is configured to operate as an Ethernet port or a Fibre Channel over Ethernet port.

13. The network device of claim 9, wherein the routing module is shared by the plurality of sub-ports.

14. The network device of claim 9, wherein the routing module is dedicated to one of the plurality of sub-ports.

15. A machine-implemented method for managing a ternary content addressable module (TCAM) for routing frames by a network device, the method comprising:
maintaining a plurality of entries at the TCAM for routing frames for a base-port of the network device having a plurality of sub-ports configured to operate independently as a port for sending and receiving information using one of a plurality of network links at a plurality of rates complying with a plurality of protocols;
using an age bit value for indicating an age for each TCAM entry;
operating a timer;
when the timer expires, updating the age bit values associated with the TCAM entries;
matching one of the plurality of TCAM entries for routing frames in the TCAM based on an incoming frame;
updating the history bit value associated with that one matched entry; and
purging TCAM entries based on the age bits to accommodate new TCAM entries.

16. The method of claim 15, wherein the network device is a switch coupled to one or more devices.

17. The network device of claim 15, wherein one of the plurality of sub-ports is configured to operate as a Fibre Channel port.

18. The method of claim 15, wherein one of the plurality of sub-ports is configured to operate as an Ethernet port or a Fibre Channel over Ethernet port.

19. The method of claim 15, wherein a routing module maintains the TCAM module for obtaining destination information for frames received by the base-port.

20. The method of claim 19, wherein the routing module is shared by the plurality of sub-ports or dedicated to one of the plurality of sub-ports.

* * * * *